United States Patent
Hu

(10) Patent No.: US 9,528,497 B2
(45) Date of Patent: Dec. 27, 2016

(54) VEHICULAR WIND POWER GENERATOR

(71) Applicant: Suey-Yueh Hu, Kaohsiung (TW)

(72) Inventor: Suey-Yueh Hu, Kaohsiung (TW)

( * ) Notice: Subject to any disclaimer, the term of this patent is extended or adjusted under 35 U.S.C. 154(b) by 0 days.

(21) Appl. No.: 14/590,224

(22) Filed: Jan. 6, 2015

(65) Prior Publication Data
US 2016/0195066 A1   Jul. 7, 2016

(51) Int. Cl.
*F03D 9/00* (2016.01)
*F03D 3/00* (2006.01)
*F03D 9/32* (2016.01)

(52) U.S. Cl.
CPC .............. *F03D 9/002* (2013.01); *F03D 3/002* (2013.01); *F03D 9/32* (2016.05); *F05B 2240/215* (2013.01); *F05B 2240/941* (2013.01)

(58) Field of Classification Search
CPC ......... Y02E 10/725; Y02E 10/72; Y02E 10/74
USPC .................................................... 290/55, 44
See application file for complete search history.

(56) References Cited

U.S. PATENT DOCUMENTS

| | | | | |
|---|---|---|---|---|
| 5,495,128 A * | 2/1996 | Brammeier | ............... | F03D 3/00 290/4 R |
| 5,512,787 A * | 4/1996 | Dederick | ................ | F03D 9/007 290/4 R |
| 6,734,645 B2 * | 5/2004 | Auerbach | ................ | B60L 7/16 318/139 |
| 7,911,076 B2 * | 3/2011 | Stephens | ................ | F03D 3/002 290/44 |
| 8,109,732 B2 * | 2/2012 | Haddjeri | ................... | F03D 1/06 290/55 |
| 8,587,145 B2 * | 11/2013 | Andujar | .................... | F03D 9/02 290/44 |
| 2003/0184096 A1 * | 10/2003 | Newman | ................. | F03B 13/24 290/54 |
| 2005/0218657 A1 * | 10/2005 | Weesner | ................. | F03D 1/003 290/55 |
| 2007/0024060 A1 * | 2/2007 | Bacon | ................... | F03D 1/0666 290/55 |
| 2008/0174119 A1 * | 7/2008 | Hu | ...................... | F03D 11/0008 290/55 |
| 2009/0278353 A1 * | 11/2009 | Da Costa Duarte Pardal | ....................... | F03D 5/00 290/44 |
| 2009/0315330 A1 * | 12/2009 | Dederick | .............. | F03B 13/142 290/53 |

(Continued)

*Primary Examiner* — Tulsidas C Patel
*Assistant Examiner* — Charles Reid, Jr.
(74) *Attorney, Agent, or Firm* — Rosenberg, Klein & Lee

(57) ABSTRACT

A vehicular wind power generator for being installed on a vehicle includes a main body, multiple blades, two stands assembled to the main body, and a maglev unit. The main body has a power-generating unit including a stator and a rotor, between which a bearing is provided. The stator and the rotor are rotatable with respect to each other, and are provided with multiple induction windings and multiple magnets respectively. The blades are assembled to combining portions peripherally provided on the main body. The maglev unit includes first and second magnetic portions provided on the stator and the blades respectively and causing magnetic induction therebetween to generate repulsion. Thereby when the vehicle is moving, wind is guided to the blades so as to make the rotor rotate with respect to the stator, and cause the induction winding and the magnets to generate electric power due to electromagnetic effects.

9 Claims, 10 Drawing Sheets

(56) References Cited

U.S. PATENT DOCUMENTS

| | | | |
|---|---|---|---|
| 2010/0231085 A1* | 9/2010 | Ifrim | H02K 1/2773 |
| | | | 310/216.123 |
| 2010/0232148 A1* | 9/2010 | Sharpley | B60P 3/18 |
| | | | 362/183 |
| 2011/0268572 A1* | 11/2011 | Wilson | F03D 1/001 |
| | | | 416/142 |
| 2012/0051912 A1* | 3/2012 | Shi | F03D 1/0633 |
| | | | 416/132 B |
| 2012/0200085 A1* | 8/2012 | Hu | F03D 9/007 |
| | | | 290/44 |
| 2012/0206003 A1* | 8/2012 | Holcomb | H02K 53/00 |
| | | | 310/114 |
| 2012/0248770 A1* | 10/2012 | Byun | F03D 1/025 |
| | | | 290/44 |
| 2012/0261924 A1* | 10/2012 | Christensen | F03D 3/002 |
| | | | 290/54 |
| 2013/0049508 A1* | 2/2013 | Willems | B60G 7/001 |
| | | | 310/105 |
| 2013/0062975 A1* | 3/2013 | Pabst | F03D 9/002 |
| | | | 310/59 |
| 2014/0252770 A1* | 9/2014 | Patel | F03D 9/021 |
| | | | 290/50 |
| 2015/0145364 A1* | 5/2015 | Holcomb | H02K 53/00 |
| | | | 310/113 |
| 2015/0215587 A1* | 7/2015 | Carpoff | F21L 13/00 |
| | | | 348/143 |

\* cited by examiner

VEHICULAR WIND POWER GENERATOR

BACKGROUND OF THE INVENTION

1. Technical Field

The present invention relates to a vehicular wind power generator, which generates electrical power from wind when a vehicle carrying the same is moving.

2. Description of Related Art

Wind power is known as a kind of green energy resources. When a vehicle moves, air flows along its contours to form wind. Thus, it is desirable to leverage the wind to generate power and charge electric vehicles and hybrid vehicles so as to make the vehicle travel further as compared to its original capacity.

Taiwan Patent No. M378970 provides a vehicular power system using wind power generation. The vehicular power system includes at least one box installed on a vehicle. The box has its front side formed with a wind inlet and its back side formed with a wind outlet. A rotating member provided in the box has a shaft terminally equipped with a wind power generator. The power generator is connected through a lead to a rectifier, which is further connected to a battery. The battery is further connected to a booster, and the booster is further connected to a driving motor of the vehicle. When the vehicle goes, the naturally generated wind enters the box from the wind inlet, and drives the rotating member to rotate. The rotation in turn drives the power generator at the terminal of the shaft to operate and generate electric power. The power such generated is then processed by the rectifier and stored in the battery. The stored power is boosted by the booster and sent to the driving motor of the vehicle. Thereby, the driving motor is powered by the wind and supports the vehicle to move.

While the prior-art device is substantially a wind power generator, its closed structure is less effective. Particularly, before reaching the rotating member, the wind is reduced by the wind inlet and the box. Moreover, the rotating member is not designed to effectively collect and leverage the incoming wind to rotate at the possibly maximum speed, so the overall power-generating efficiency is poor.

Taiwan Patent Application No. 096129585 provides a vehicular power generator that comprises at least an impeller set and a fixing seat. The impeller set comprises an outer frame, a shaft, a plurality of blades and a plurality of supports. Each of the blades has two opposite ends provided with pivots to connect between the outer frame and the shaft, so that the blades can swing between the outer frame and the shaft. The shaft has two opposite ends provided with wheels around which a belt is mounted. The other end of the belt is mounted around a rotor of a power generator that is connected to a battery of a vehicle. Thereby, air flow along the contours of the moving vehicle drives the blades to rotate, so the power generator is operated to generate power and to store the generated power in the battery for the vehicle to use.

However, the prior-art device is bulky and, when installed on a roof of a vehicle, tends to cause the vehicle to fail to meet traffic regulations about height, and endanger the vehicle when passing through tunnels and traffic signs due to the height that exceeds the safe height limit.

SUMMARY OF THE INVENTION

Hence, in view of the shortcomings of the prior art, the present invention provides a vehicular wind power generator for being installed on a vehicle, which comprises a main body, a plurality of blades, a maglev unit, and two stands. The main body has a power-generating unit that includes a stator, a rotor rotating with respect to the stator, a bearing provided between the stator and the rotor, a plurality of induction windings wound outside the stator, and a plurality of magnets located in the rotor. The main body has two opposite ends thereof each being provided with an axle portion , and has a periphery extending between the two opposite ends provided with a plurality of combining portions. The plurality of blades are assembled to the combining portions of the main body and each have an engaging portion configured to engage with a corresponding one of the combining portions. The maglev unit includes at least one first magnetic portion provided on the stator, and includes at least one second magnetic portion provided on at least one of the blades. The first magnetic portion and the second magnetic portion are of an identical magnetic pole, so that magnetic induction between the first magnetic portion and the second magnetic portion generates repulsion. The two stands are assembled to the axle portions correspondingly and each have a fixing portion corresponding to a respective one of the axle portions. Whereby when the vehicle is moving, wind is guided to the blades so as to make the rotor rotate with respect to the stator, and cause the induction windings and the magnets to generate electric power due to electromagnetic effects.

Further, the combining portions each comprise a ridge and a groove, wherein the ridge is raised from the periphery of the main body, while the groove is formed on the ridge. The engaging portion of each of the blades is a wedge that is configured to be fitted in a correspond one of the grooves.

Further, the grooves have a dovetailed or doubly dovetailed sectional shape, and the wedges have a dovetailed or doubly dovetailed sectional shape matching the dovetailed or doubly dovetailed section of the grooves.

Further, the blades are bent.

Further, each of the blades comprises a first blade, a second blade, and a pivot portion connected to the first blade and the second blade, so that the first blade and the second blade of each of the blades are pivotable with respect to each other.

Further, the axle portions are holes and the fixing portions are inserts that each are configured to be fitted in a corresponding one of the holes.

Further, each of the blades has a free end formed with a bent and taper terminal.

Further, each of the blades has a length greater than a length of the main body.

Further, each of the stands is an extendable stand.

The present invention has the following advantages:

1. The present invention uses the air flow around a driving vehicle to drive the blades to generate power and feed back the power to the vehicle.

2. The present invention is particularly suitable for environmentally friendly electric vehicles and hybrid vehicles by supplying the electric power the vehicle needs when driving so as to make the vehicle travel further as compared to its original capacity.

3. The present invention has an open structure and is installed on the trunk of the vehicle, so the air flowing along the contours of the vehicle can be guided directly to the blades, and since the blades have large wind-receiving area, the main body can generate more electric power.

4. In the present invention, the free ends of the blades are bent and taper, which is effective in collecting wind, thereby enhancing the device's power-generating efficiency.

5. In the present invention, at the sites where the blades are assembled to the main body there is a reinforcing design that prevents the blades from breakage or coming off the main body under strong wind.

6. In the present invention, the height and width of the main body are smaller than the height and width of the roof of the vehicle, so the vehicle is ensured to conform to the general traffic regulations about loading.

7. With the repulsion generated between the first magnetic portion and the second magnetic portion, maglev rotation between the stator and the rotor can be achieved, thereby eliminating the risk of wear between components due to eccentric rotation caused by the gravity.

8. The grooves have a dovetailed or doubly dovetailed sectional shape, and the wedges also have a dovetailed or doubly dovetailed sectional shape matching that of the grooves, so the replacement of the blades is more convenient and the combination between the grooves and the engaging portions is more reliable.

9. Each of the blades is composed of the first and second blades pivotally connected by the pivot portion. Thereby, when the vehicular wind power generator is not in use, the first and second blades can pivot with respective to each other and thus be folded, so as to reduce the overall volume and support convenient storage. When the vehicular wind power generator encounters air flow, the first and second blades are pushed by the wind to pivot and expand, thereby increasing the wind-receiving area.

10. Since the length of the blades is greater than that of the main body, the wind-receiving area is increased, thereby increasing the rotary speed of the rotor and in turn improving power-generating efficiency.

11. Since the stands are extendable, the vehicular wind power generator can be installed on the vehicle in an altitudinal adjustable manner.

DETAILED DESCRIPTION OF THE INVENTION

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

Figure 1:
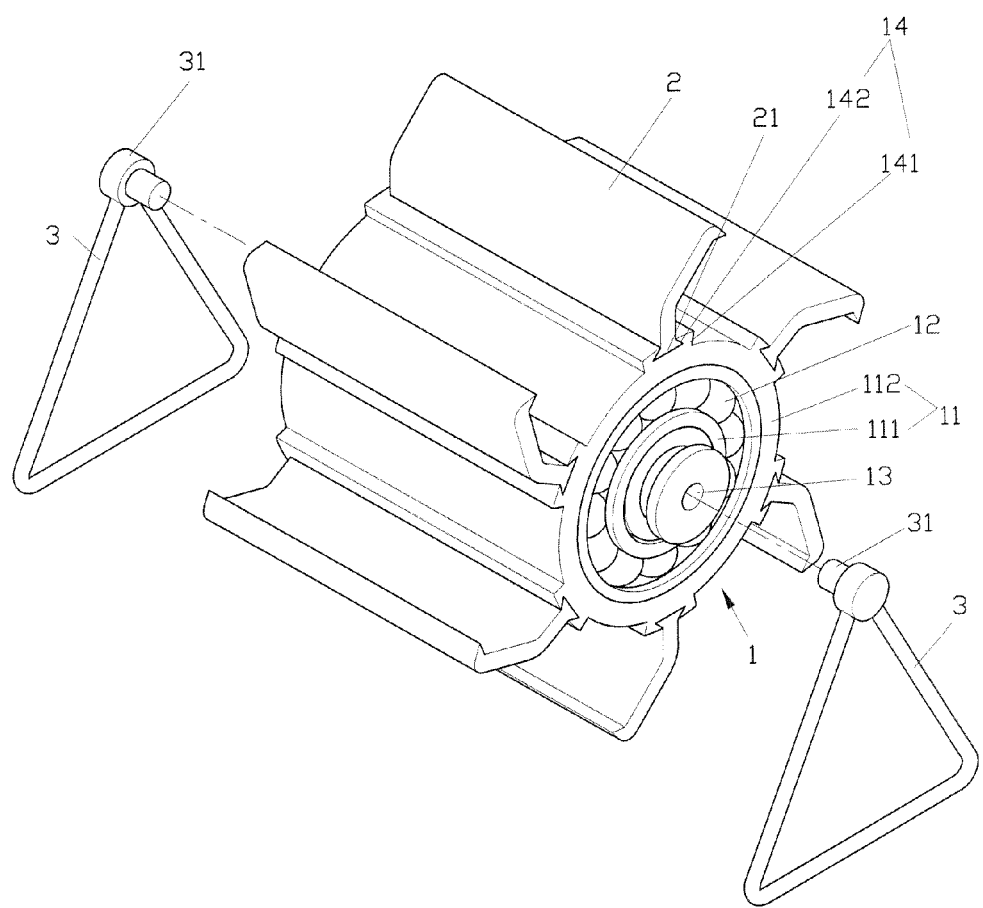
FIG. 1 is an exploded view of a vehicular wind power generator in accordance with a first embodiment of the present invention.
Figure 2:
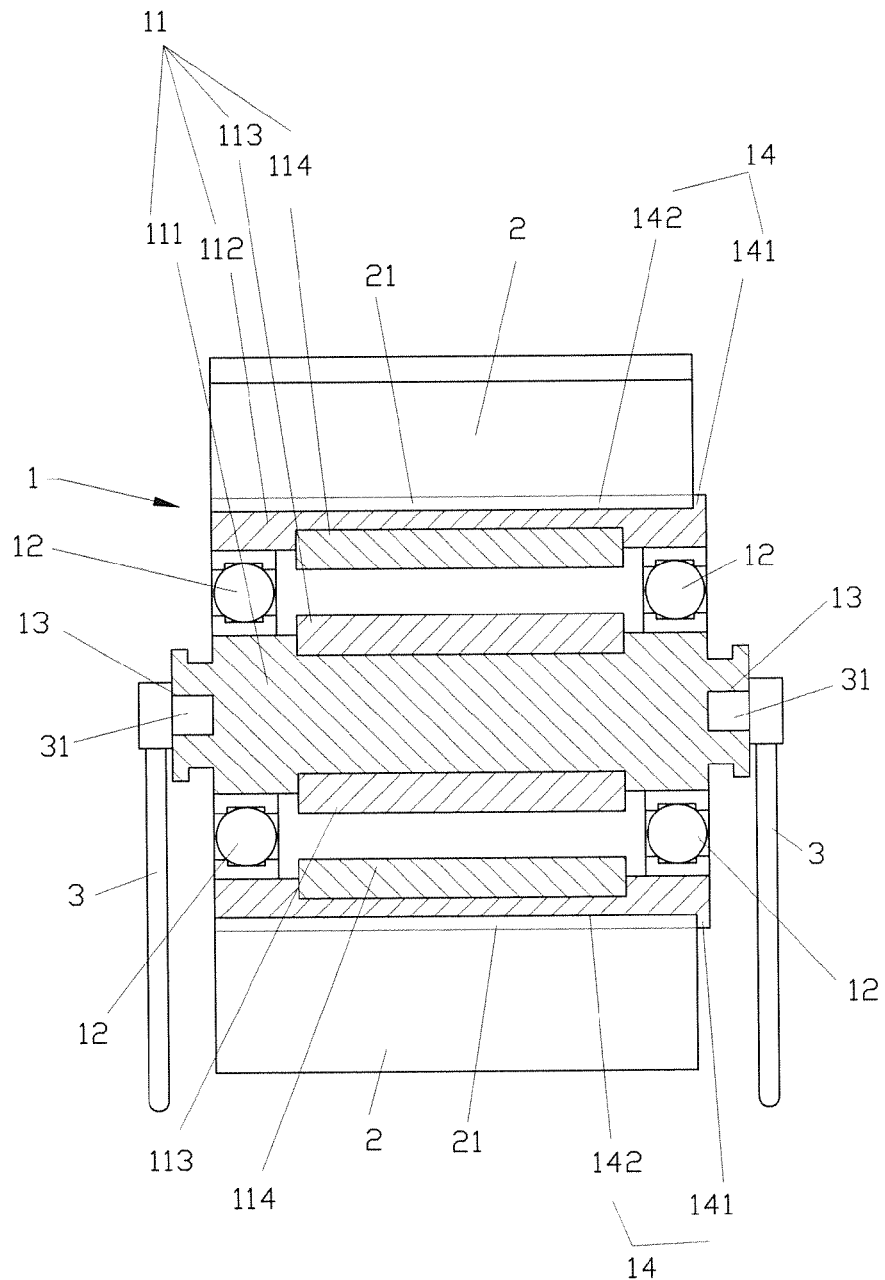
FIG. 2 is a cross-sectional view of the vehicular wind power generator in accordance with the first embodiment of the present invention.
Figure 3:
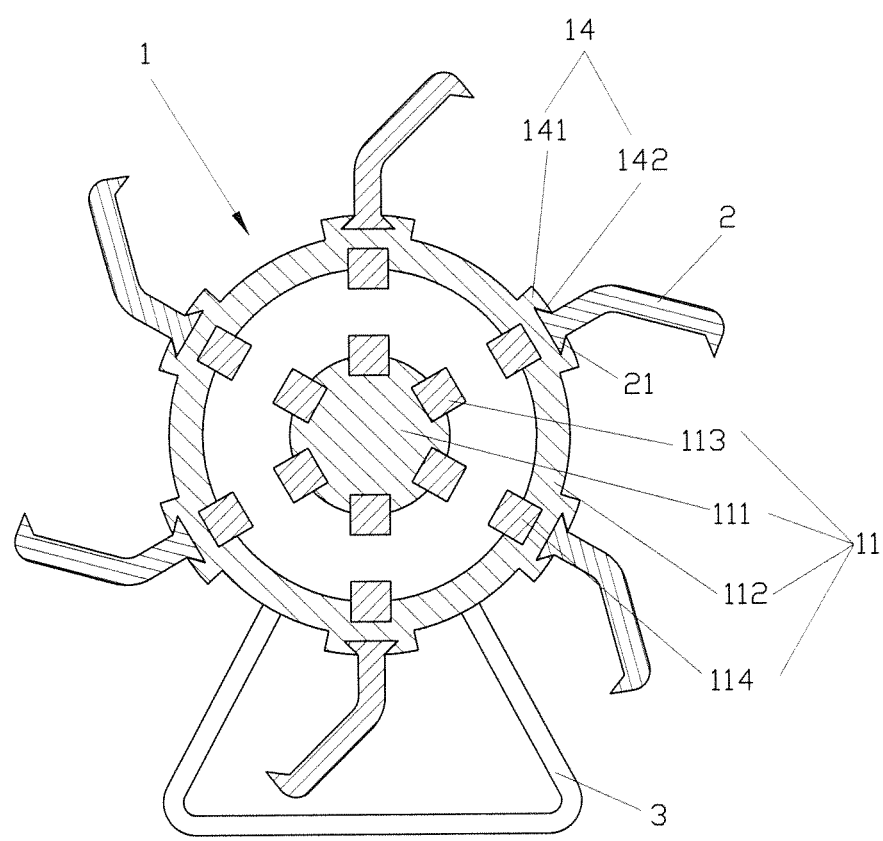
FIG. 3 is another cross-sectional view of the vehicular wind power generator in accordance with the first embodiment of the present invention.

Referring to FIG. 1, FIG. 2 and FIG. 3, in a first embodiment of the present invention, a vehicular wind power generator for being installed on a vehicle comprises a main body (1), a plurality of blades (2) and two stands (3).

The main body (1) has a power-generating unit (11). The power-generating unit (11) has a stator (111) and a rotor (112) rotating with respect to each other. Between the stator (111) and the rotor (112) there is a bearing (12). The stator (111) is peripherally provided with a plurality of induction windings (113). The rotor (112) has a plurality of magnets (114). The main body (1) has two opposite ends each being provided with an axle portion (13). The main body (1) is peripherally provided with a plurality of combining portions (14). Each of the combining portions (14) comprises a ridge (141) raised from the periphery of the rotor (112). The ridge (141) is formed with a groove (142). In the present embodiment, the groove (142) has a dovetailed sectional shape.

The blades (2) are assembled to the combining portions (14) of the main body (1). Each of the blades (2) has its one end provide with an engaging portion (21) that is configured to engage with the corresponding combining portion (14). The engaging portion (21) of the blade is a wedge to be fitted in the groove (142). In the present embodiment, the wedge also has a dovetailed sectional shape, and the blade (2) has an opposite free end formed with a bent and taper terminal. The blade (2) is bent.

The stands (3) are assembled to the axle portions (13). Each of the stands (3) has a fixing portion (31) corresponding to a respective one of the two axle portions (13). In more detail, each of the axle portions is a hole, and each of the fixing portions (31) is an insert. Thereby, the main body (1) can be fixed to the roof or the trunk of a vehicle through the stands (3).

Figure 4:
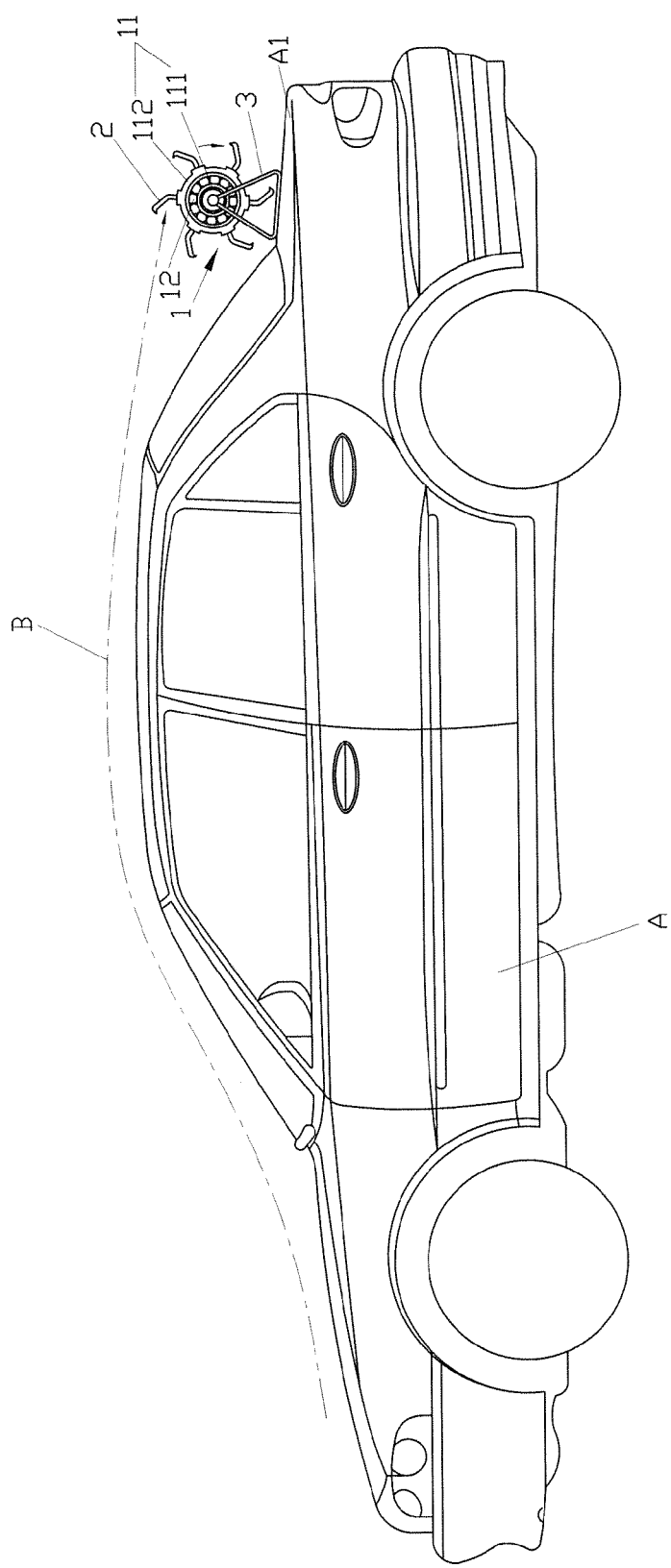
FIG. 4 is an applied view of the vehicular wind power generator in accordance with the first embodiment of the present invention installed on a vehicle trunk.
Figure 5:
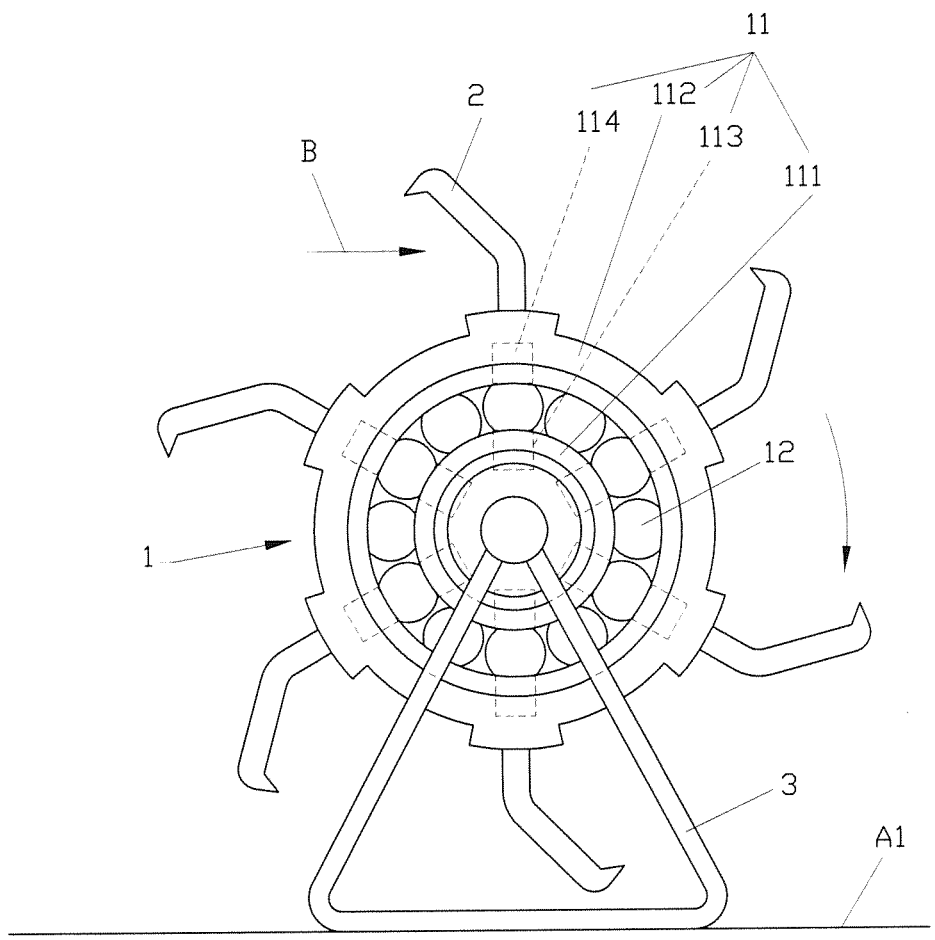
FIG. 5 is a schematic view illustrating the vehicular wind power generator in accordance with the first embodiment of the present invention generating electric power from wind.

In use, as shown in FIG. 4, the main body (1) is mounted on the trunk (A1) of the vehicle (A) through the stands (3). Alternatively, the stands (3) may be fixed to the roof of the vehicle (A). Thus, when the vehicle (A) is moving, a large quantity of air (B) flows along the contours of the vehicle (A). When air flow (B) reaches the trunk (A1) of the vehicle (A), the blades (2) assembled to the main body (1) are hit by the air flow (B) and start to rotate. Since each of the blades (2) is shaped like an eagle wing that is favorable to collection of air, the blades (2) hit by the air flow (B) rotate in an increased velocity, in turn making the rotor (112) rotate about the stator (111) in an increased velocity. As shown in FIG. 5, interaction between the magnets (114) of the rotating rotor (112) and the induction windings (113) of the stator (111) provides electromagnetic effects to make the induction windings (113) of the stator (111) generate an electromotive force, thereby supplying an electric current to a battery (not shown) of the vehicle (A). The electric current is then converted into and stored as electric power usable to the vehicle (A). Where the vehicle (A) is an electric vehicle or a hybrid vehicle, the electric power supplied by the main body (1) serves to add the miles the vehicle (A) could travel with its originally remained power. For example, in the case that the miles could reach with the remained power is 200 kilometers, with the additionally supplied electric power, 100 kilometers of travel mileage can be added. Therefore, the present invention is particularly suitable for environmentally friendly electric vehicles and hybrid vehicles by supplying the electric power the vehicle (A) needs when driving so as to make the vehicle (A) travel further as compared to its original capacity.

It is to be noted that, as shown in FIG. 1 and FIG. 2, at the sites where the blades (2) are assembled to the main body (1) there is a reinforcing design that prevents the blades (2) from breakage or coming off the main body (1) under strong wind. In addition, the height of the main body (1) is smaller than the height of the roof of the vehicle (A), and the width of the main body (1) is smaller than the width of the trunk of the vehicle (A), as shown in FIG. 4. Thereby, the vehicle (A) is ensured to conform to the general traffic regulations about loading, and free from the risk that the vehicle (A) might exceed the safe height limit when passing through tunnels and traffic signs.

Figure 6:
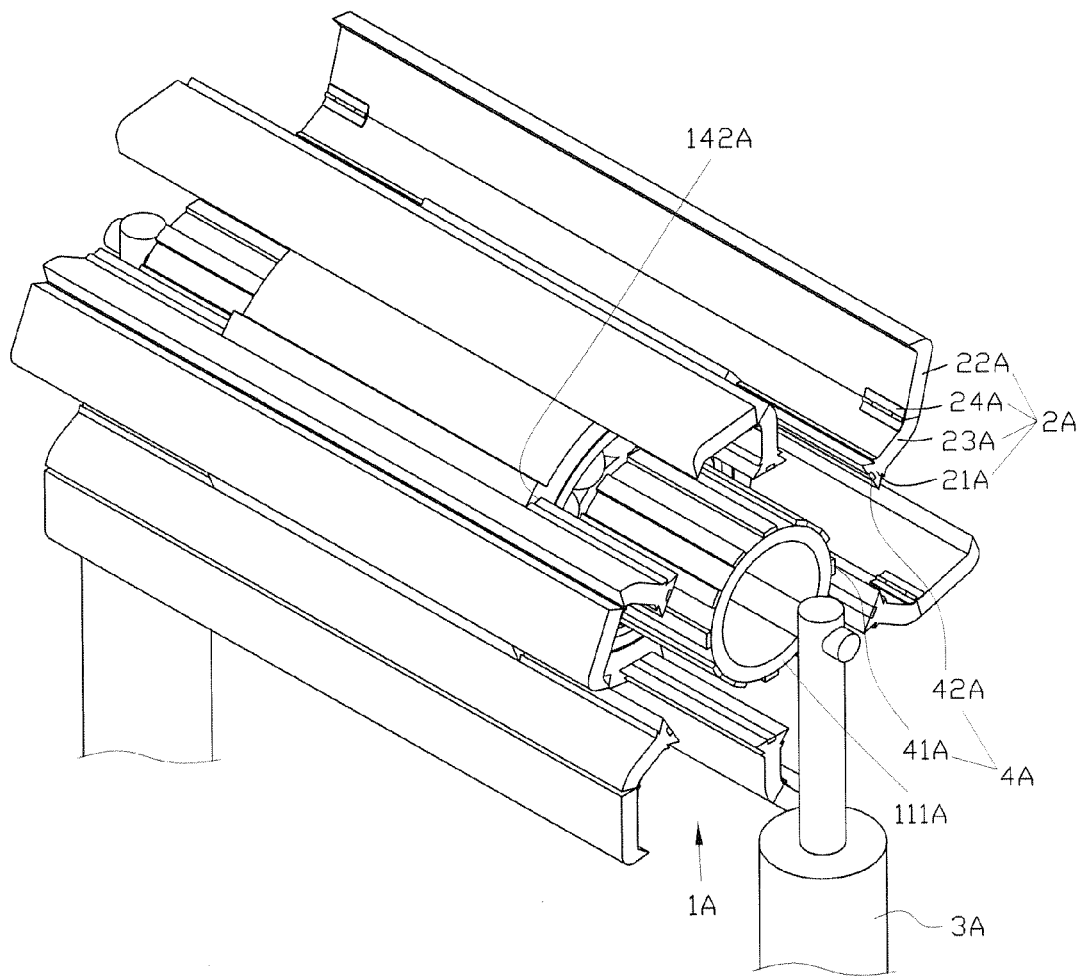
FIG. 6 is a perspective view of a vehicular wind power generator in accordance with a second embodiment of the present invention.
Figure 7:
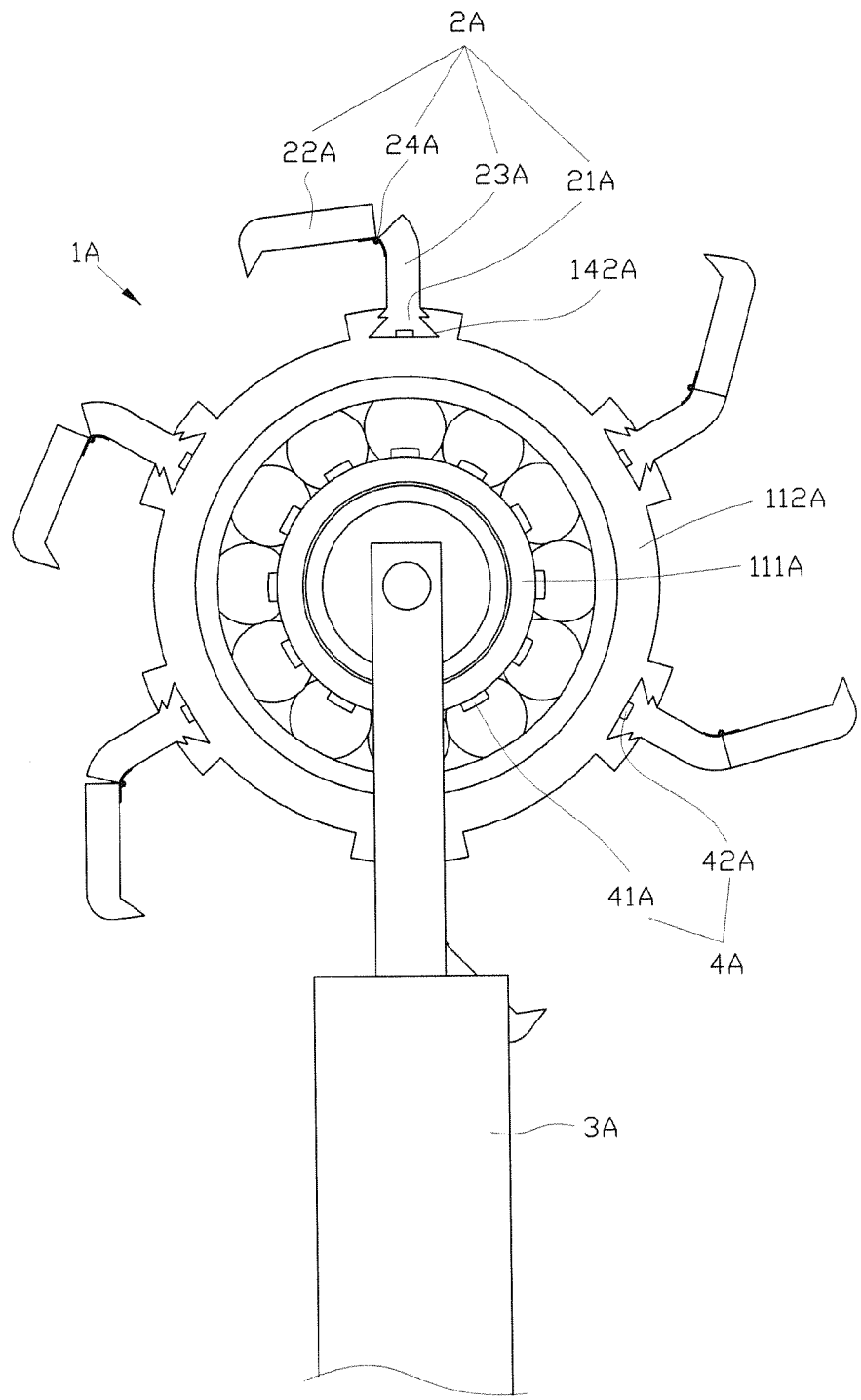
FIG. 7 is a side view of the vehicular wind power generator in accordance with the second embodiment of the present invention.

Referring to FIG. 6 and FIG. 7, in a second embodiment of the present invention, a vehicular wind power generator comprises a main body (1A), a plurality of blades (2A), a maglev unit (4A), and two stands (3A).

The second embodiment is different from the first embodiment in that each of the grooves (142A) has a doubly dovetailed sectional shape, and each of the wedges of the engaging portion (21A) also has a doubly dovetailed sectional shape matching that of the groove (142A), so the replacement of the blades (2A) is more convenient and the combination between the grooves (142A) and the engaging portions (21A) is more reliable.

Each of the blades (2A) comprises a first blade (22A), a second blade (23A), and a pivot portion (24A). The first blade (22A) and the second blade (23A) are connected to the pivot portion (24A). In the present embodiment, the pivot portion (24A) is a hinge, so that the first blade (22A) and the second blade (23A) are pivotable with respect to each other and retain each other to form a bent shape. With such a design, when the vehicular wind power generator is to be stored, the blades (2A) can be folded into a compact structure for saving storage space, and when the vehicular wind power generator is to be used, the blades (2A) can be automatically expanded when encountering wind to increase their wind receiving area.

The blades (2A) and the stator (111A) each have a length along the rotary axis greater than that of the main body (1A). The maglev unit (4A) includes a plurality of first magnetic portions (41A) and a plurality of second magnetic portions (42A), wherein the first magnetic portions (41A) are provided on the stator (111A) and face the blades (2A), and the second magnetic portions (42A) are provided on the blades (2A) and face the stator (111A). In the present embodiment, the first magnetic portions (41A) and the second magnetic portions (42A) are permanent magnets of the same polarity. Thereby, the first magnetic portions (41A) and the second magnetic portions (42A) generate magnetic induction that incurs repulsion, so that coaxial rotation of the stator (111A) and the rotor (112A) under maglev (magnetic levitation) effects can eliminate the risk of wear between components due to eccentric rotation caused by the gravity. Moreover, since the blades (2A) have increased wind-receiving area, they can drive the rotor (112A) to rotate with increased velocity, thereby improving the overall power-generating efficiency.

Figure 9:
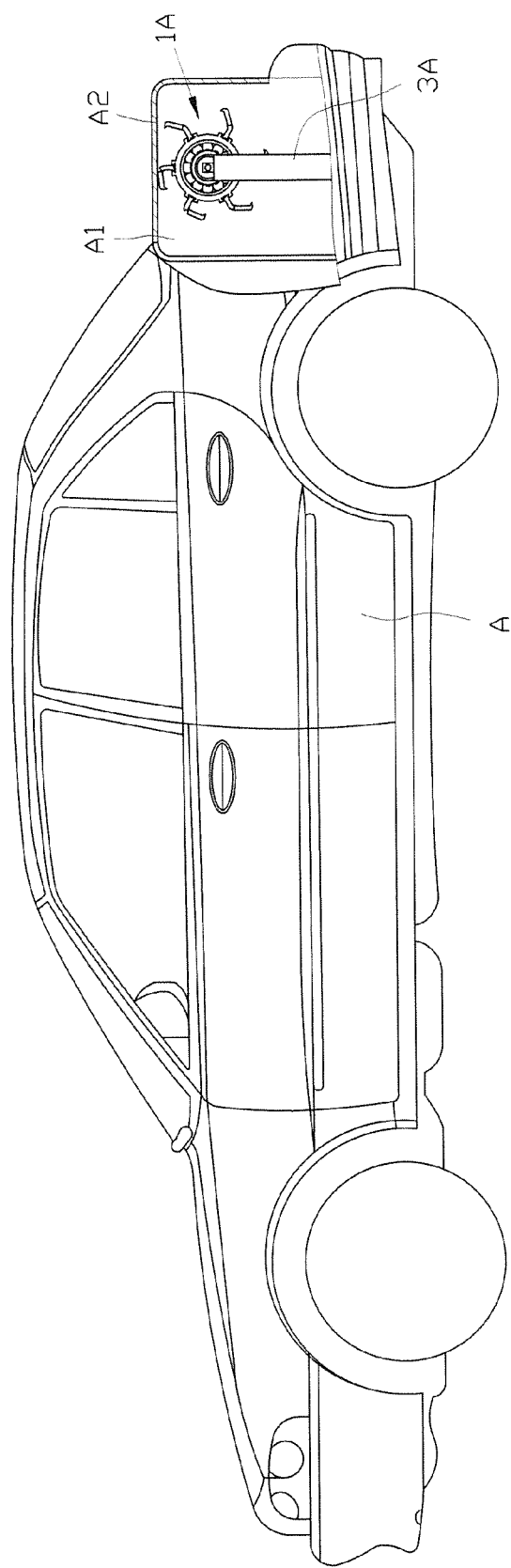
FIG. 9 is an applied view showing how the vehicular wind power generator in accordance with the second embodiment of the present invention is installed on a vehicle.

The stands (3A) are extendable stands, so that when the disclosed vehicular wind power generator is assembled to a vehicle (A), the height can be adjusted for convenient storage, as shown in FIG. 9.

Figure 8:
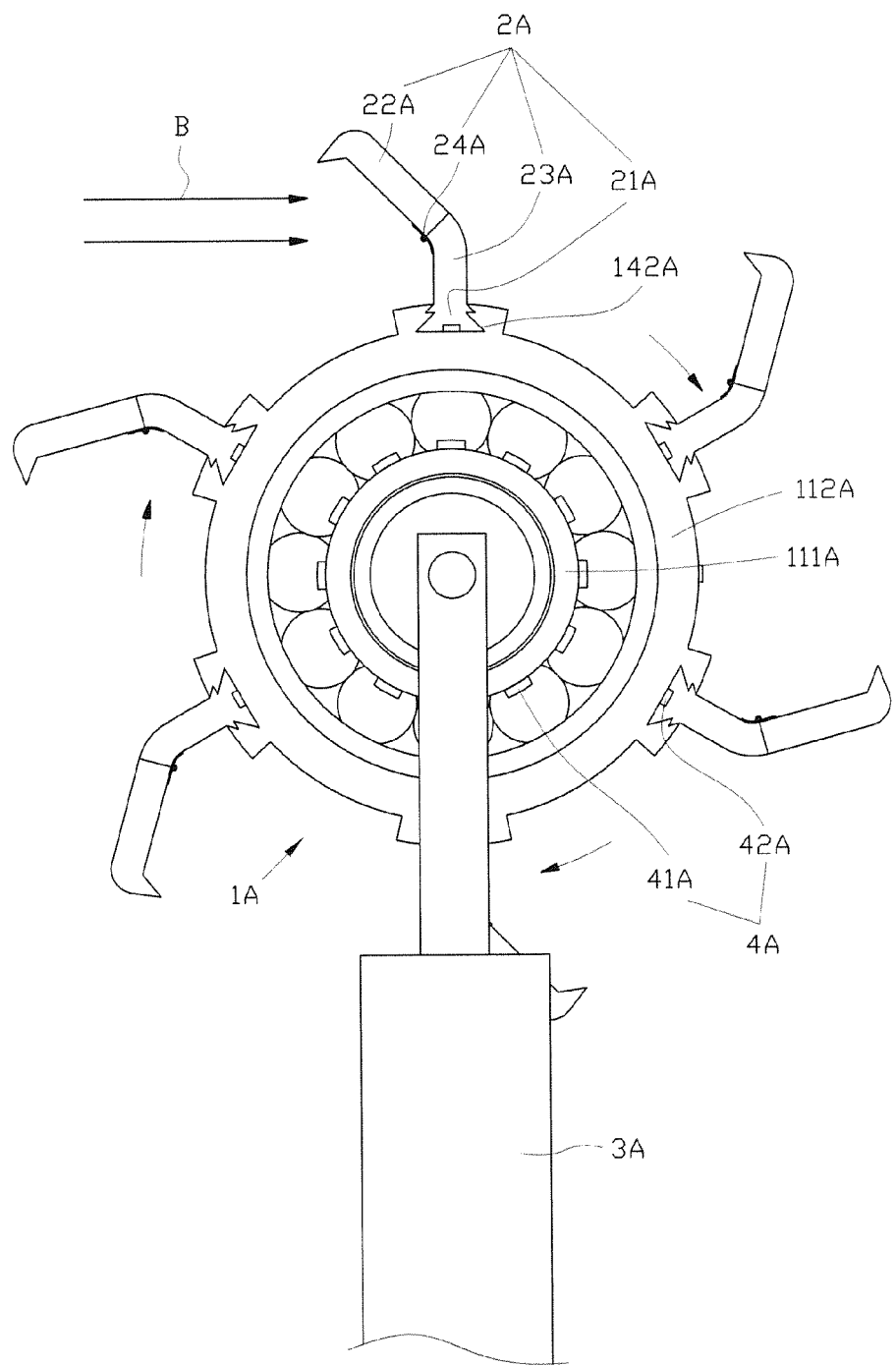
FIG. 8, similar to FIG. 7, showing how the blades of the vehicular wind power generator in accordance with the second embodiment of the present invention are moved by wind.

Referring to FIG. 7 and FIG. 8, when the vehicular wind power generator of the second embodiment is not hit by air (B) (as shown in FIG. 7), the first blade (22A) and the second blade (23A) of each of the blades (2A) can pivot with respective to each other and thus folded, so as to reduce the overall volume and support convenient storage. When the vehicular wind power generator encounters air flow (B) (as shown in FIG. 8), the first blade (22A) and the second blade (23A) of each of the blades (2A) are pushed by the wind to pivot and expand to a predetermined extent that they are retained by each other to form a bent shape, thereby increasing the wind-receiving area. Furthermore, throughout the rotation, the rotary inertia maintains the first blade (22A) and the second blade (23A) expanded to provide the increased wind-receiving area. With the blades (2A) further widened, the rotary velocity of the rotor (112A) under the given air flow (B) can be enhanced to provide improved power-generating efficiency (also referring to FIG. 6).

Figure 10:
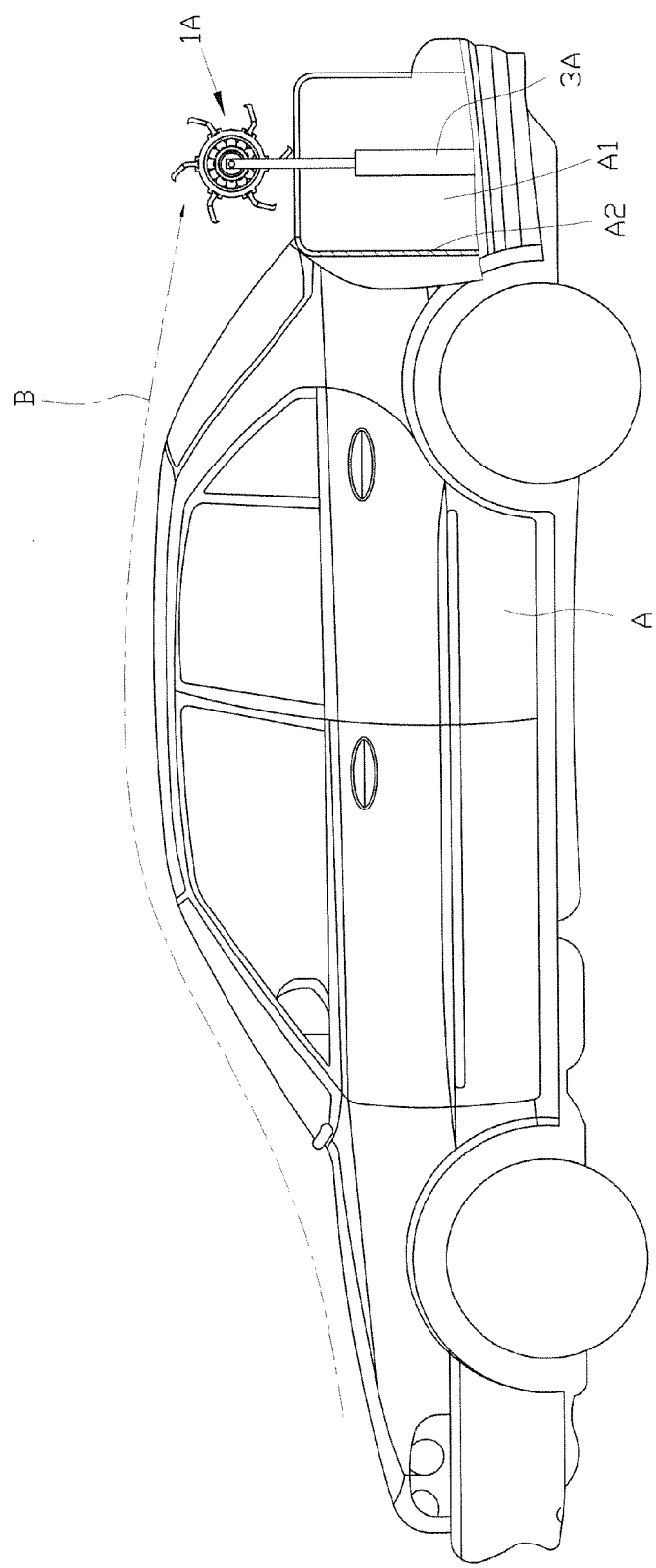
FIG. 10 is also an applied view showing how the vehicular wind power generator in accordance with the second embodiment of the present invention is installed on the vehicle.

Please refer to FIG. 9 and FIG. 10 for applied views of the vehicular wind power generator of the second embodiment installed on a vehicle (A). Since the stands (3A) are extendable, the vehicular wind power generator can be installed in a trunk (A1) of the vehicle (A) in an altitudinal adjustable manner. As shown in FIG. 9, when the car speed is relatively low and not favorable to power generation, the stands (3A) can be retracted so the vehicular wind power generator can be completely contained in the trunk (A1) of the vehicle (A). On the other hand, as shown in FIG. 10, when the car speed is relatively high and favorable to power generation, the trunk lid (A2) and the stands (3A) may be electrically controlled so that the trunk lid (A2) of the vehicle (A) is open and the stands (3A) are expanded to lift the vehicular wind power generator outside the trunk (A1), thereby performing power generation. In the present embodiment, the trunk lid (A2) is formed as a roller shutter, so as to minimize the possibility that it, when open, blocks the air flow (B) from hitting the vehicular wind power generator.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A vehicular wind power generator for being installed on a vehicle, comprising:
    a main body having a power-generating unit,
        wherein the power-generating unit includes a stator and a rotor rotatable with respect to each other;
        wherein a bearing is provided between the stator and the rotor, a plurality of induction windings are wound outside the stator, and a plurality of magnets are provided in the rotor; and
        wherein the main body has two opposite ends each being provided with an axle portion, the main body having a peripheral wall portion defined on the rotor coaxially about the axle portion and extending axially between the two opposite ends, the peripheral wall portion having a plurality of combining portions formed to extend axially therealong;

a plurality of blades each assembled to the combining portions of the main body to flare radially outward therefrom, each blade having an engaging portion formed along a radially inner edge configured to engage in dovetailed manner axially along a corresponding one of the combining portions;

a maglev unit including at least one first magnetic portion and at least one second magnetic portion, wherein the at least one first magnetic portion is provided on the stator, and the at least one second magnetic portion is provided on at least one of the blades; wherein the first magnetic portion and the second magnetic portion are of an identical magnetic pole for repulsive magnetic coupling radially therebetween; and two stands, each being assembled to a respective one of the two axle portions and having a fixing portion corresponding to the respective one of the two axle portions, whereby when the vehicle is moving, wind is guided to the blades so as to make the rotor rotate with respect to the stator, and cause the induction windings and the magnets to generate electric power due to electromagnetic effects.

2. The vehicular wind power generator of claim 1, wherein the combining portions each include a ridge raised from the periphery of the main body and a groove formed on the ridge; and wherein the engaging portion of each of the blades is a wedge that is configured to be fitted in the groove of a corresponding one of the combining portions.

3. The vehicular wind power generator of claim 2, wherein the grooves have a dovetailed or doubly dovetailed sectional shape, and the wedges have a dovetailed or doubly dovetailed sectional shape matching the dovetailed or doubly dovetailed sectional shape of the grooves.

4. The vehicular wind power generator of claim 1, wherein the blades are bent.

5. The vehicular wind power generator of claim 4, wherein the blades each include a first blade, a second blade, and a pivot portion connected to the first blade and the second blade, so that the first blade and the second blade of each of the blades are pivotable with respect to each other.

6. The vehicular wind power generator of claim 1, wherein each of the axle portions defines a hole, and each of the fixing portions defines an insert configured to be fitted in a respective one of the holes.

7. The vehicular wind power generator of claim 1, wherein the blades each have a free end formed with a bent and tapered terminal end.

8. The vehicular wind power generator of claim 1, wherein the blades each have a length greater than a length of the main body.

9. The vehicular wind power generator of claim 1, wherein the stands are each extendable to lift the main body from a base thereof.

* * * * *